United States Patent
Leone

(10) Patent No.: US 8,352,160 B2
(45) Date of Patent: *Jan. 8, 2013

(54) REFORMATE CONTROL VIA ACCELEROMETER

(75) Inventor: Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/362,475

(22) Filed: Jan. 31, 2012

(65) Prior Publication Data

US 2012/0130621 A1   May 24, 2012

Related U.S. Application Data

(63) Continuation of application No. 13/168,377, filed on Jun. 24, 2011, now Pat. No. 8,108,125, which is a continuation of application No. 12/756,897, filed on Apr. 8, 2010, now Pat. No. 8,041,500.

(51) Int. Cl.
*G06F 19/00* (2011.01)
*F02D 41/04* (2006.01)
*F02P 5/15* (2006.01)

(52) U.S. Cl. ............ 701/104; 701/83; 701/84; 701/110; 701/111; 123/406.47

(58) Field of Classification Search .............. 123/3, 330, 123/331, 347, 348, 350, 352, 357, 370, 371, 123/402, 403, 436, 478, 480, 492, 493, 536, 123/538, 406.45, 406.47; 701/69, 82, 84, 701/93, 94, 101–105, 110, 111, 115; 477/184–187; 423/648

See application file for complete search history.

(56) References Cited

U.S. PATENT DOCUMENTS

| | | | |
|---|---|---|---|
| 5,000,151 A | 3/1991 | Eisele et al. |
| 5,176,122 A | 1/1993 | Ito |
| 5,224,452 A | 7/1993 | Tomizawa |
| 5,372,411 A | 12/1994 | Gerstenmaier et al. |
| 5,445,019 A | 8/1995 | Glidewell et al. |
| 5,526,797 A | 6/1996 | Stokes |
| 5,542,394 A | 8/1996 | Tomisawa |
| 5,633,458 A | 5/1997 | Pauli et al. |
| 5,682,864 A | 11/1997 | Shirakawa |
| 5,740,667 A | 4/1998 | Bhattacharyya et al. |

(Continued)

FOREIGN PATENT DOCUMENTS

EP   2 048 339 A1   4/2009

(Continued)

OTHER PUBLICATIONS

Kamio, Junichi, et al., "Study on HCCI-SI Combustion Using Fuels Containing Ethanol", SAE Technical Paper Series No. 2007-01-4051, Powertrain & Fluid Systems, Conference & Exhibition, Rosemont, IL, Oct. 29-Nov. 1, 2007, 12 Pgs.

(Continued)

*Primary Examiner* — Willis R Wolfe, Jr.
(74) *Attorney, Agent, or Firm* — Julia Voutyras; Alleman Hall McCoy Russell & Tuttle LLP

(57) ABSTRACT

Engine surge includes oscillations in engine torque resulting in bucking or jerking motion of a vehicle that may degrade driver experience. The present application relates to increasing reformate entering an example engine cylinder in response to engine surge.

7 Claims, 5 Drawing Sheets

U.S. PATENT DOCUMENTS

| | | |
|---|---|---|
| 5,762,366 A | 6/1998 | Faye |
| 5,857,445 A | 1/1999 | Shimada et al. |
| 6,024,069 A | 2/2000 | Yoshino |
| 6,058,906 A | 5/2000 | Yoshino |
| 6,088,647 A | 7/2000 | Hemberger et al. |
| 6,176,215 B1 | 1/2001 | Baur et al. |
| 6,213,104 B1 | 4/2001 | Ishikirlyama et al. |
| 6,220,221 B1 | 4/2001 | Flinspach et al. |
| 6,247,449 B1 | 6/2001 | Persson |
| 6,318,306 B1 | 11/2001 | Komatsu |
| 6,334,424 B1 | 1/2002 | Ito |
| 6,349,702 B1 | 2/2002 | Nishiyama |
| 6,390,030 B1 | 5/2002 | Isogawa et al. |
| 6,591,817 B2 | 7/2003 | Deutsch |
| 6,705,295 B1 | 3/2004 | Tarroux et al. |
| 6,711,893 B2 | 3/2004 | Ueda et al. |
| 6,729,301 B2 | 5/2004 | Nakamori et al. |
| 6,751,543 B2 | 6/2004 | Gras et al. |
| 6,851,398 B2 | 2/2005 | Taylor, III et al. |
| 6,964,261 B2 | 11/2005 | Warne et al. |
| 6,988,481 B2 | 1/2006 | Sen et al. |
| 6,990,956 B2 | 1/2006 | Niimi |
| 6,997,142 B2 | 2/2006 | Wakao et al. |
| 7,047,940 B2 | 5/2006 | Niimi |
| 7,089,888 B2 | 8/2006 | Mirji |
| 7,104,244 B2 | 9/2006 | Nishi et al. |
| 7,159,541 B2 | 1/2007 | Wakao et al. |
| 7,203,579 B2 | 4/2007 | Yokota et al. |
| 7,228,841 B2 | 6/2007 | Takemoto et al. |
| 7,261,065 B2 | 8/2007 | Aimoto et al. |
| 7,370,609 B2 | 5/2008 | Kamio |
| 7,454,898 B2 | 11/2008 | Allgeier et al. |
| 7,523,744 B2 | 4/2009 | Ayame |
| 7,530,335 B2 | 5/2009 | Sakurai et al. |
| 7,758,468 B2 | 7/2010 | Vafidis et al. |
| 8,001,934 B2 | 8/2011 | Leone et al. |
| 8,015,952 B2 | 9/2011 | Pursifull |
| 8,037,850 B2 | 10/2011 | Pursifull |
| 8,041,500 B2 * | 10/2011 | Leone ............ 701/104 |
| 8,108,125 B2 * | 1/2012 | Leone ............ 701/104 |
| 8,118,006 B2 | 2/2012 | Pursifull |
| 8,146,541 B2 | 4/2012 | Surnilla et al. |
| 2001/0003977 A1 | 6/2001 | Hayashi et al. |
| 2004/0139944 A1 | 7/2004 | Nakano et al. |
| 2008/0010993 A1 | 1/2008 | Morgenstern |
| 2008/0098985 A1 | 5/2008 | Kamio |
| 2008/0141984 A1 | 6/2008 | Haga |
| 2008/0221778 A1 | 9/2008 | Kakuho et al. |
| 2008/0228375 A1 | 9/2008 | Ashida et al. |
| 2008/0282998 A1 | 11/2008 | Kuzuoka et al. |
| 2009/0017987 A1 | 1/2009 | Saton et al. |
| 2009/0030588 A1 | 1/2009 | Yamashita |
| 2009/0043479 A1 | 2/2009 | Noda et al. |
| 2009/0065409 A1 | 3/2009 | Kamio et al. |
| 2009/0071453 A1 | 3/2009 | Stockhausen et al. |
| 2010/0004843 A1 | 1/2010 | Yu et al. |
| 2010/0313847 A1 | 12/2010 | Leone et al. |
| 2011/0132283 A1 | 6/2011 | Czekala et al. |
| 2011/0132284 A1 | 6/2011 | Leone et al. |
| 2011/0132286 A1 | 6/2011 | Leone et al. |
| 2011/0132289 A1 | 6/2011 | Pursifull et al. |
| 2011/0132290 A1 | 6/2011 | Leone et al. |
| 2011/0132306 A1 | 6/2011 | Kerns et al. |
| 2011/0137537 A1 | 6/2011 | Leone |
| 2011/0229400 A1* | 9/2011 | Guo et al. ............ 423/437.1 |

FOREIGN PATENT DOCUMENTS

| | | |
|---|---|---|
| FR | 2931236 A3 | 11/2009 |
| JP | 2003068338 A | 3/2003 |

OTHER PUBLICATIONS

Hoffmann, Walter, et al., "A New Approach to Ethanol Utilization: High Efficiency and Low Nox in an Engine Operating on Simulated Reformed Ethanol", SAE Technical Paper Series No. 2008-01-2415, Powertrain, Fuels, & Lubricants Meeting, Rosemont, IL, Oct. 6-9, 2008, 11 Pgs.

Morgenstern, David A., et al., "Low Temperature Reforming of Ethanol over Copper-Plated Randy Nickel: A New Route to Sustainable Hydrogen for Transportation" revised manuscript received May 4, 2005, pp. 9.

Green Car Congress, "Honda Making Significant Progress on HCCI Engine for Hybrid Application" Oct. 28, 2009, http://www.greencarcongress.com/2005/10/honda_making_si.html, 8 Pgs.

* cited by examiner

REFORMATE CONTROL VIA ACCELEROMETER

CROSS REFERENCE TO RELATED APPLICATIONS

The present application is a continuation of U.S. patent application Ser. No. 13/168,377 filed Jun. 24, 2011, now U.S. Pat. No. 8,108,125, which is a continuation of U.S. patent application Ser. No. 12/756,897 filed Apr. 8, 2010, now U.S. Pat. No. 8,041,500, the entire contents of each of which are incorporated herein by reference for all purposes.

TECHNICAL FIELD

The present application relates to hydrogen-rich reformate and more particularly, to preventing or mitigating engine surge.

BACKGROUND AND SUMMARY

Engine surge (one example of engine combustion instability) includes oscillations in engine torque. Such oscillations in engine torque result in reduced drive feel.

In one approach a wheel brake pressure is controlled in response to measurements of engine torque. By increasing wheel brake pressure on one or more wheels in response to engine surge, vehicle traction may be improved during surge. Consequently, drivability may be improved.

The inventors herein have recognized issues with the above described approach. Controlling wheel brake pressure does not address the underlying engine conditions leading to engine surge. Without addressing the underlying engine conditions, engine surge may persist.

Consequently, systems, devices and methods are disclosed for engine control for a reformate engine. As one example, a method for an engine includes reforming fuel at a catalyst into reformate; and adjusting a supply of reformate to a cylinder of the engine in response to an engine surge, the surge including an oscillation in torque produced by the engine. The fuel to be reformed may include, for example, ethanol, another alcohol, gasoline, diesel fuel, or a combination of fuels.

One advantage of the example is that surge may be mitigated. Further, the present example allows for a smaller and lower cost reformer, if desired, because the supply of reformate to the engine cylinder is adjusted in response to surge, rather than continuously maintained at an unnecessarily high level during engine operation. By adjusting reformate in combination with further vehicle operating parameters, like charge dilution, wheel brake and spark timing, engine surge is mitigated while achieving increased engine efficiency due to aggressive use of lean burn, exhaust gas recirculation (EGR), and/or variable valve timing (VVT).

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1:
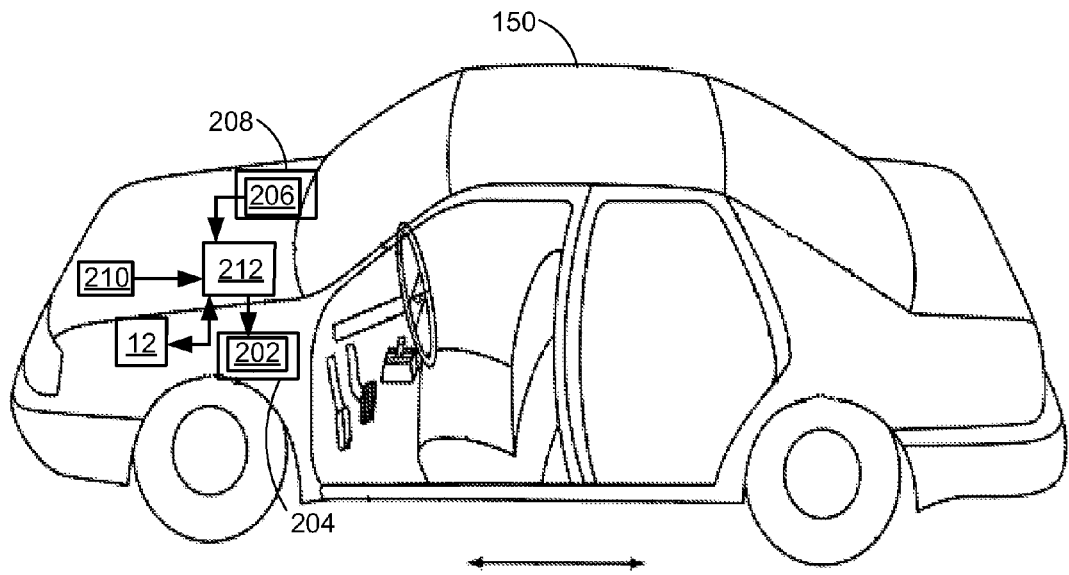
FIG. 1 shows a schematic representation of a vehicle illustrating example locations wherein longitudinal acceleration sensors may be placed on the vehicle.
Figure 3:
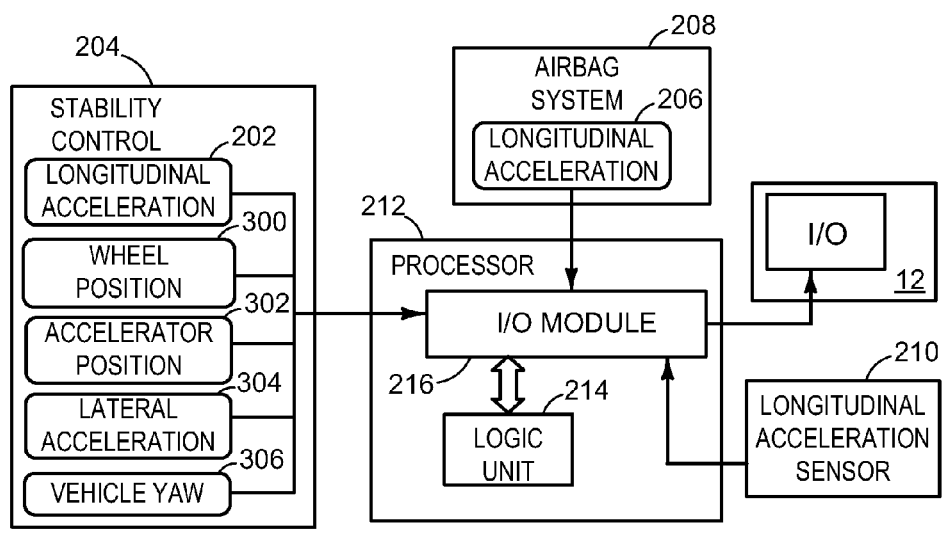
FIG. 3 shows a block diagram of systems and devices related to sensing acceleration in a vehicle.
Figure 2:
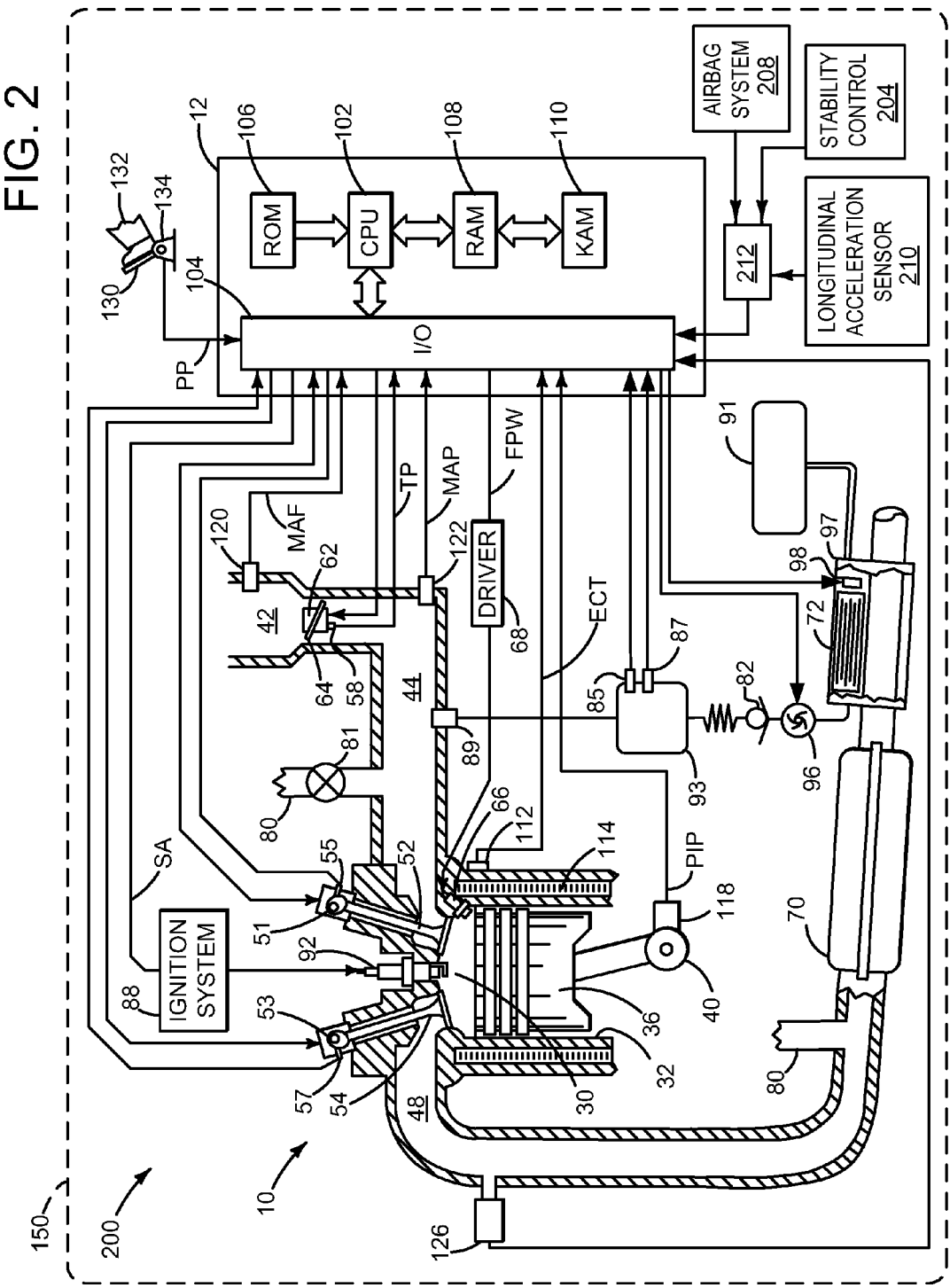
FIG. 2 shows a schematic diagram of an example internal combustion engine.

Initially, an example vehicle, including an engine and further systems, such as a reformate system and a stability control, are described with respect to FIGS. 1 and 2. FIG. 3 is then discussed, which shows a block diagram further describing some of the systems and devices related to sensing acceleration in a vehicle. A first example routine is described with respect to FIG. 4 as one example of a method for controlling reformate use in an engine, such as reformed ethanol. Further, a subroutine shown in FIG. 5 is discussed as one example of a method for determining a feasibility of increasing a percentage of reformate in an example charge.

FIG. 1 is a schematic illustration of a vehicle 150, and FIG. 2 is a schematic illustration of a system 200 that may be included in the vehicle 150. The vehicle 150 and the system 200 may have one or more longitudinal acceleration sensors (which are all example accelerometer sensors) in accordance with various embodiments. Various numbers and configurations of acceleration sensors may be used. One or more longitudinal acceleration sensors that may already be present on the vehicle 150 may be used, or one or more longitudinal acceleration sensors may be added to the vehicle 150. Three longitudinal acceleration sensors are illustrated in FIGS. 1 and 2. One longitudinal acceleration sensor 202 may be included as part of a stability control 204 for the vehicle 150. The stability control 204 may be an electronic stability control (ESC) or a rollover stability control (RSC), or the like. Another longitudinal acceleration sensor (e.g., 206 of FIG. 3) may be included as part of an airbag system 208 for the vehicle 150. Another longitudinal acceleration sensor 210 may be an add to the vehicle 150.

The processor 212 may be operatively coupled with an engine controller 12. The system 200 may include an ignition system 88 that may be configured to provide an ignition spark to combustion chamber 30 via spark plug 92 in response to a spark advance signal SA, or a spark retard signal SR from engine controller 12, under select operating modes, and in accordance with instructions from the processor 212.

Alternatively, the processor 212, and/or functions described herein may be included as part of the engine controller 12, and may in particular be included as part of a microprocessor unit (CPU) 102.

Engine controller 12 is shown in FIG. 2 as a microcomputer, including microprocessor unit 102, input/output ports 104, an electronic storage medium for executable programs and calibration values shown as read only memory chip 106 in this particular example, random access memory 108, keep alive memory 110, and a data bus.

Engine controller 12 may receive various signals from sensors coupled to engine 10, in addition to those signals previously, and hereinafter, discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor 62; a measurement of reformer tank pressure from pressure sensor 85; and a measurement of reformer tank temperature from temperature sensor 87; and absolute manifold pressure signal, MAP, from sensor 122. Engine speed signal, RPM, may be generated by engine controller 12 from signal PIP. Barometric pressure may also be sensed (sensor not shown) for processing by controller 12.

FIG. 2 illustrates one cylinder of multi-cylinder engine 10, which is included in a propulsion system of vehicle 150. Engine 10 may be controlled at least partially by a control system including the engine controller 12 and by input from a vehicle operator 132 via an input device 130. In this example, input device 130 includes an accelerator pedal and the pedal position sensor 134 for generating a proportional pedal position signal PP. Engine 10 includes combustion chamber 30 and cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10. Combustion chamber 30 is shown communicating with intake manifold 44 and exhaust manifold 48 via respective intake valve 52 and exhaust valve 54.

In this example, intake valve 52 and exhaust valves 54 may be controlled by cam actuation via respective cam actuation systems 51 and 53. Cam actuation systems 51 and 53 may each include one or more cams and may utilize variable valve timing (VVT) which includes one or more of cam profile switching (CPS), variable cam timing (VCT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation (EVA). For example, cylinder 30 may alternatively include an intake valve controlled via electric valve actuation and an exhaust valve controlled via cam actuation including CPS and/or VCT systems.

Intake manifold 44 is also shown coupled to the engine cylinder having fuel injector 66 coupled thereto for delivering liquid fuel in proportion to the pulse width of signal FPW from controller 12. Fuel is delivered to fuel injector 66 by a fuel system including fuel tank 91, fuel pump (not shown), fuel lines (not shown), and fuel rail (not shown). The engine 10 of FIG. 1 is configured such that the fuel is injected directly into the engine cylinder, which is known to those skilled in the art as direct injection. Alternatively, liquid fuel may be port injected. Fuel injector 66 is supplied operating current from driver 68 which responds to controller 12. In addition, intake manifold 44 is shown communicating with optional electronic throttle 64. In one example, a low pressure direct injection system may be used, where fuel pressure can be raised to approximately 20-30 bar. Alternatively, a high pressure, dual stage, fuel system may be used to generate higher fuel pressures.

Gaseous fuel may be injected to intake manifold 44 by way of fuel injector 89. In another embodiment, gaseous fuel may be directly injected into cylinder 30. One example of gaseous fuel is reformate. Gaseous fuel is supplied to fuel injector 89 from storage tank 93 by way of pump 96 and check valve 82. Pump 96 pressurizes gaseous fuel supplied from fuel reformer 97 in storage tank 93. Check valve 82 limits flow of gaseous fuel from storage tank 93 to fuel reformer 97 when the output of pump 96 is at a lower pressure than storage tank 93. Fuel reformer 97 includes catalyst 72 and may further include optional electrical heater 98 for reforming liquid fuel (such as ethanol) supplied from fuel tank 91. Fuel reformer 97 is shown coupled to the exhaust system downstream of catalyst 70 and exhaust manifold 48. However, fuel reformer 97 may be coupled to exhaust manifold 48 and located upstream of catalyst 70. For example, fuel reformer 97 may use a catalyst and exhaust heat to drive an endothermic dehydrogenation of alcohol supplied by fuel tank 91 to promote fuel reformation.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example. Further, in the present example engine 10 includes an EGR conduit 80 to direct exhaust gases, upstream of converter 70 and/or downstream of converter 70 back to the intake manifold 44. In further examples, EGR conduit 80 may not be coupled to intake 42 upstream of throttle 64. Further, EGR conduit 80 includes an EGR valve 81 which meters flow through the EGR conduit, and may be a continuously variable valve or a two position on/off valve.

In a preferred aspect of the present description, engine position sensor 118 produces a predetermined number of equally spaced pulses every revolution of the crankshaft from which engine speed (RPM) can be determined. In one embodiment, the stop/start crank position sensor has both zero speed and bi-directional capability. In some applications a bi-directional Hall sensor may be used, in others the magnets may be mounted to the target. Magnets may be placed on the target and the "missing tooth gap" can potentially be eliminated if the sensor is capable of detecting a change in signal amplitude (e.g., use a stronger or weaker magnet to locate a specific position on the wheel). Further, using a bi-dir Hall sensor or equivalent, the engine position may be maintained through shut-down, but during re-start alternative strategy may be used to assure that the engine is rotating in a forward direction.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Turning now to FIG. 3, processor 212, stability control 204, airbag system 208, and longitudinal acceleration sensor 210 are shown in further detail. Example spark timing adjustments and charge reformate concentration adjustments may occur upon recognizing a steady state of the vehicle while the vehicle is in operation on a driving surface. The system 200 may include various sensors, in addition to the one or more longitudinal acceleration sensors 202, 206, 210 that may be configured to recognize the steady state. For example, a wheel position sensor 300 may be coupled to the processor 212, and configured to sense a wheel position that is substantially unchanged for more that a predetermined amount of time; an accelerator position sensor 302 may be coupled to the processor 212, and configured to sense an accelerator position being substantially unchanged for a predetermined length of time; a lateral acceleration sensor 304 may be coupled to the processor 212, and configured to sense changes in lateral acceleration being below a predetermined threshold for more than a predetermined amount of time; and a vehicle yaw sensor 306 may be coupled to the processor 212, and configured to sense changes in yaw of the vehicle being below a predetermined threshold for more than a predetermined amount of time. The accelerator position sensor 302 may be the same, or different than the pedal sensor 134 discussed above.

In the present example, an additional longitudinal acceleration sensor 206 is included as part of an airbag system 208 for the vehicle 150. Another longitudinal acceleration sensor 210 may be added to the vehicle 150. Each of the longitudinal sensors may be coupled with a processor 212. The processor 212 may be configured to affect increasing or decreasing a percentage of reformate in a charge of air and fuel flowing to one or more example engine cylinders based on an output from one or more of the longitudinal acceleration sensors 202, 206, 210. Further processor 212 may be configured to advance or retard spark timing of an internal combustion engine 10 configured to power the vehicle 150. The processor 212 may further be configured to effect a spark timing adjustment of the engine toward a peak torque timing.

In the present example, the processor 212 includes a logic unit 214 configured to adjust charge reformate concentration, as discussed above. Further, logic unit 214 may be configured to output a spark timing control signal to the engine controller 12 to adjust the spark timing of the internal combustion engine 10 of the vehicle 150 in a first direction. The logic unit 214 may be further configured for further adjusting the spark timing in the first direction in the case of a positive acceleration or to adjust the spark timing in a second direction in the case of a negative acceleration. The processor 212 may also include an input/output module 216 configured to receive a signal from the longitudinal acceleration sensor and configured to pass the signal to the logic unit 214.

Figure 4:
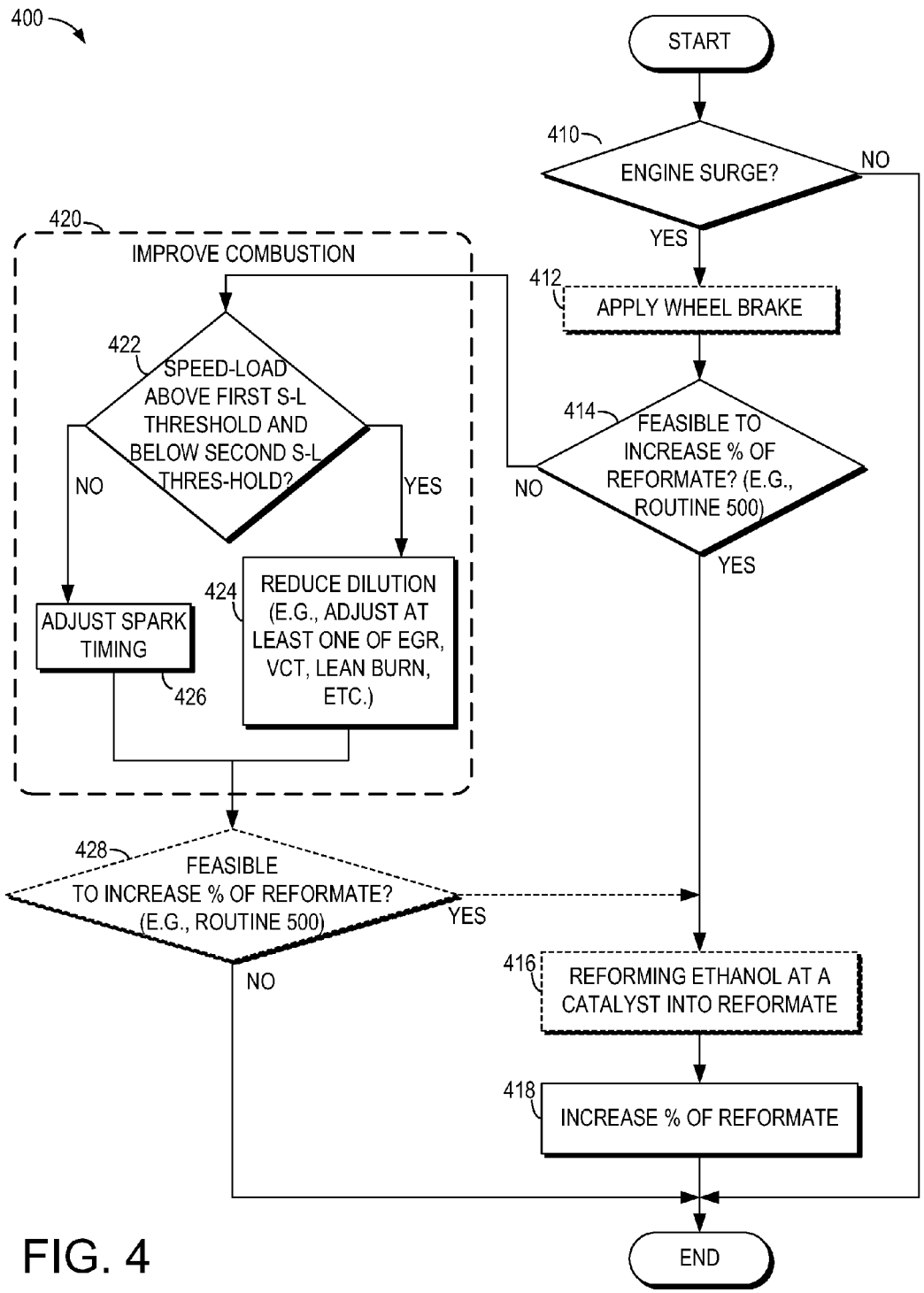
FIG. 4 illustrates an example routine for adjusting a supply of reformate to a cylinder of the engine in response to an engine surge.
Figure 5:
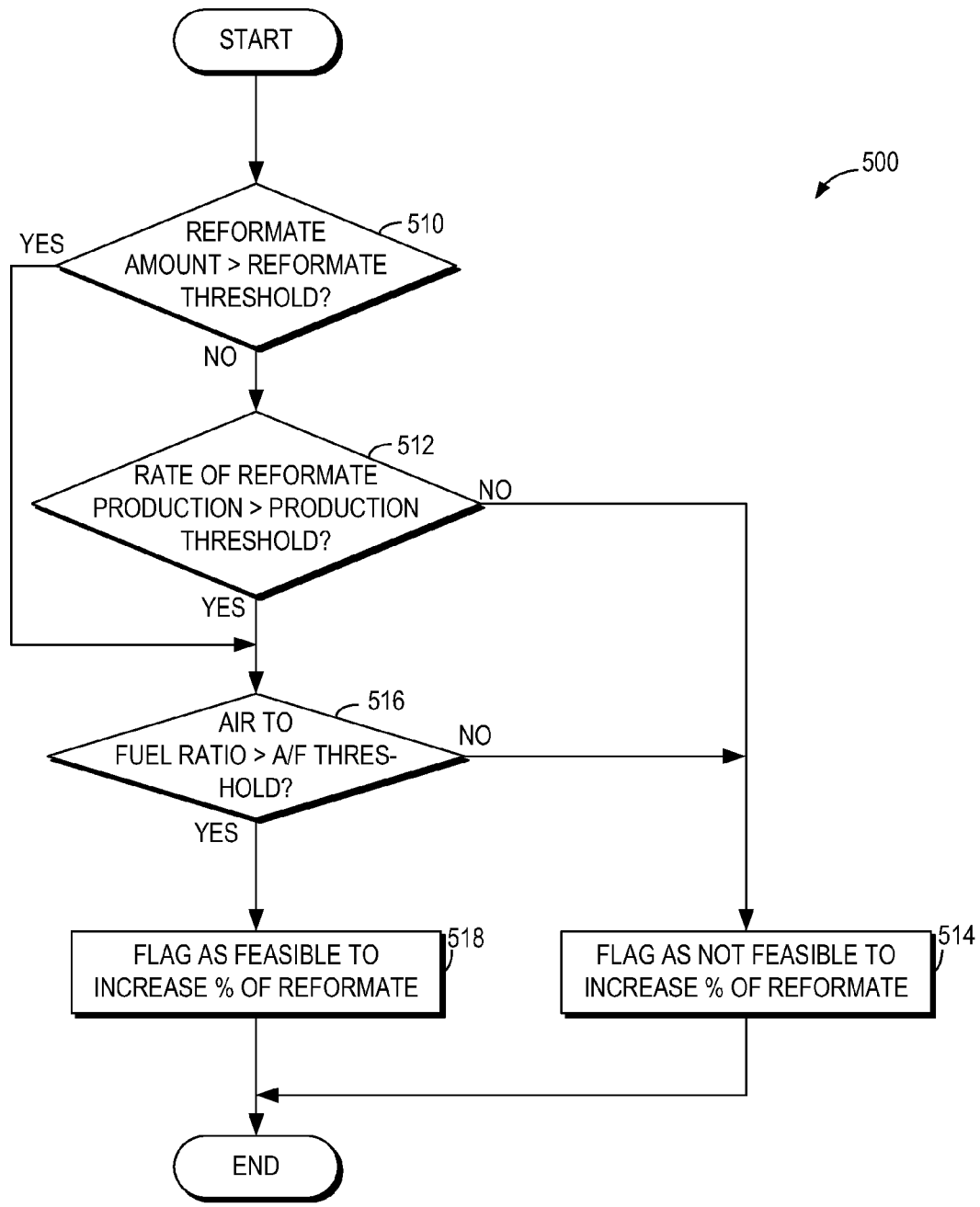
FIG. 5 illustrates an example subroutine for determining a feasibility of increasing a percentage of reformate in an example engine cylinder.

Turning now to FIG. 4, a routine 400 is shown. Routine 400 may be a set of instructions on a read-only memory included in an example controller. Routine 400 may be carried out in an example vehicle (e.g. 150 described above) including an engine, a catalyst for reforming liquid fuel into reformate and one or more accelerometers. Further, routine 400 in may be included in a method, the method including adjusting a supply of reformate to a cylinder of the engine in response to an engine surge, the surge including an oscillation in torque produced by the engine, an accelerometer sensor indicating the oscillation in torque.

In the present example, it will be appreciated that measurements of engine conditions and parameters are assumed to take place when needed or be stored in a memory readily accessible to routine 400. Engine conditions and parameters include valve timing, engine coolant temperature, acceleration along one or more axis, air to fuel ratio, percentage opening of an example EGR valve, etc.

In the present example, routine 400 begins at 410, 410 including determining if an engine is surging. In one example, an acceleration is detected by one or more longitudinal acceleration sensors. The example acceleration may be oscillating, as a result of oscillating torque brought on by surge. Further, 410 may include band pass filtering an acceleration signal to frequencies above and below a surge window of frequencies. In some examples, amplitudes, intensities, and/or a strength of frequencies in the surge window above a surge threshold determines that there is surge (e.g., the example engine is in a surge state). In the present example, if surge is not present, routine 400 ends.

When routine 400 ends the example engine may continue operating nominally. In this way, a method including routine 400 may include a first operating mode of supplying a first charge reformate concentration to a cylinder in the engine during a nominal engine combustion state.

If engine surge is present, routine 400 continues to optionally apply a wheel brake at 412 or to determine the feasibility of increasing a percentage of reformate entering one or more engine cylinders at 414. In this way, routine 400 includes a second mode. The second mode may further include supplying a second charge reformate concentration to the cylinder in the engine, the second charge reformate concentration greater than the first charge reformate concentration (e.g., at 418). The second mode also includes increased engine surge as compared to the first mode, discussed above. The second mode may include an engine surge state monitored by an example accelerometer sensor coupled in an example vehicle body.

In further examples, 410 includes more generally, determining if combustion is stable. Such further examples may include one or more determinations based on charge motion, dilution, knock detection, a compressor speed (such as in a turbocharger or supercharger), MAP, MAF, etc. In such examples, if combustion is stable, routine 400 ends.

Continuing with routine 400, as discussed above in some examples after 410 the routine includes at 412 applying a wheel brake to one or more wheels of the example vehicle. Further 412 may include increasing pressure to the example wheel brake, selectively and/or repeatedly. Further, applying the wheel brake may be done without a request from an operator to do so. Applying the wheel brake in response to engine surge or combustion instability is well known to those of skill in the art and is optional in routine 400, hence the dashed line at 412. After 412 and 410, routine 400 may continue to 414.

After 412 or in response to determining that engine surge is present at 410, routine 400 continues to 414 which includes determining if increasing a percentage of reformate in one or more cylinders of the engine is feasible. 414 may include determining if there is enough reformate available. Routine 500, discussed below with respect to FIG. 5, is one example of determining if increasing charge reformate concentration is feasible.

If at 414, routine 400 determines that it is feasible to increase charge reformate concentration, then routine 400 continues to 418 to increase the percentage of reformate in a charge entering at least one example engine cylinder. Optionally, routine 400 may include reforming liquid fuel at the example catalyst into reformate at 416 before continuing to 418. 416 is in dashed lines to indicate its optional nature. By reforming liquid fuel at the catalyst before increasing the percentage of reformate in charge entering an example engine cylinder at 418, routine 400 may ensure that reformate in a storage tank stays above a reformate threshold, being a quantity of reformate desired for nominal operation of the engine.

Continuing with routine 400, in the present example 418 includes increasing the supply of reformate to the cylinder of the engine in response to surge. In some examples, increasing the percentage of reformate includes incrementing an amount of reformate injected into an intake manifold and/or an example engine cylinder. In further examples, 418 includes maintaining a consistent air to fuel concentration and therefore an amount of non-reformate fuel injected into the intake manifold and/or the engine cylinder is decremented or decreased. After the percentage of reformate is increased, routine 400 ends.

If at 414, routine 400 determines that it is not feasible to increase charge reformate concentration, and then routine 400 continues to 420. 420 includes improving combustion. In the present example, improving combustion includes decreasing charge dilution, (e.g., via reducing EGR, advancing or retarding variable valve timing such as VCT, and reducing lean burn) and/or advancing or retarding spark timing. In additional examples, 420 includes further actions to increase charge combustibility.

Additionally at 420, combustion may be improved via adjusting charge dilution or spark timing. Engine conditions may be adjusted enough at 420 to lead to probable stable combustion during the next ignition event in the example engine. However, in further examples charge dilution and/or spark timing may be adjusted, but intentionally not enough to lead to probable stable combustion during the next ignition event. In such example, routine 400 includes 428, discussed below.

In the present example, improving combustion at 420 includes determining if an engine speed-load is above first s−1 threshold and the engine speed-load is below second s−1 threshold at 422. 422 is one example of determining a condition of the example engine (e.g., as discussed in further detail below, with respect to FIG. 6). In a first condition charge dilution may be adjusted (e.g., at 424). In a second condition, spark timing may be adjusted (e.g., at 426). In further examples, both spark timing and charge dilution may be adjusted. The condition of the engine, such as a high engine speed and high engine load, may lead to a preferred or effective set of actions for improving combustion.

In the present example, if the engine has a speed-load above a first s−1 threshold and below second s−1 threshold at 422, routine 400 continues to 424 to reduce charge dilution. Reducing charge dilution includes adjusting VVT, an EGR valve, etc. In further examples of routine 400, if the example engine has a speed-load above a first s−1 threshold and below second s−1 threshold, the engine may additionally or alternatively adjust spark timing at 424.

If the engine has a speed-load below a first s−1 threshold or above second s−1 threshold at 422, routine 400 continues to 426 to adjust spark timing. Adjusting spark timing at 426 includes adjusting toward a best torque or away from a best torque. Adjusting timing at 426 includes adjusting timing based on feedback from one or more example longitudinal acceleration sensors to minimize engine surge.

After either 426 or 424, routine 400 may optionally continue to 428. In further examples of routine 400, the routine may end after either 426 or 424.

428 includes determining the feasibility of increasing the percentage of reformate in the charge in one or more engine cylinders, as described above with respect to 414. The 428 is shown in dashed lines to indicate its optional inclusion in routine 400. If increasing a percent of reformate is feasible, routine 400 continues to 416 to reform liquid fuel into reformate (optionally) or routine 400 continues directly to 418 to increase reformate percentage in a charge, as described above. If not, routine 400 ends.

By inclusion of 428, routine 400 includes adjusting at least one of charge dilution level and/or spark timing in combination with increasing the supply of reformate to the cylinder of the engine. In further examples, where 428 is not included, and routine 400 may repeatedly run to carry out continuous control of reformate concentration, charge dilution and spark timing.

Additional examples of routine 400 may include decreasing the supply of reformate to the cylinder in response to a dissipation of engine surge, where the dissipation of engine surge includes engine torque oscillations in a surge window below a surge threshold.

By inclusion of 422 and 414, routine 400 may include determining a condition of an example engine to effect how to response to engine surge. In this way, routine 400 includes a method for the engine including during a first condition, adjusting charge dilution in response to engine surge, the first condition including a speed-load above a first s−1 threshold and the speed-load also below a second s−1 threshold, during a second condition, adjusting spark timing in response to engine surge and during a third condition, adjusting reformate delivered to the engine in response to engine surge, the third condition including at least one of a reformate amount above a reformate threshold and a rate of reformate production above a production threshold. Engine surge may include torque oscillations indicated by an example longitudinal acceleration sensor, as discussed above.

Further, reformate delivered to the engine may be adjusted before adjusting spark timing or charge dilution are adjusted (e.g., by repeated iterations of routine 400). Further still, charge dilution may be adjusted before spark timing (e.g., via repeated iterations of routine 400 and at 420) and additionally, reformate delivered to the engine in response to engine surge may be adjusted after adjusting at least one of charge dilution and spark timing (e.g., at 420 and then at 428 and then at 418).

One advantage of routine 400 is that the feedback controls described above allow a smaller and cheaper reformer, because reformate concentration is adjusted in response to surge. Further, surge is mitigated and engine efficiency may be improved due to aggressive use of lean burn, EGR and/or VCT.

Turning now to FIG. 5, a routine 500 is illustrated for determining if increasing charge reformate concentration is feasible. Routine 500 is one example of a subroutine included in routine 400 at 414 and optionally again at 428. As discussed above, with respect to routine 400, routine 500 may be a set of instructions on a read-only memory and be implemented on an example engine, including a reformate catalyst and an accelerometer.

Routine 500 starts at 510, which includes determining if a reformate amount is above a reformate threshold. The reformate amount in the present example is a quantity of reformate in an example gaseous fuel storage tank. The reformate threshold may be a mass, pressure or a volume. Inclusion of 510 is one example of how a method may increase the supply of reformate to the cylinder of the engine in response to surge and a reformate amount in a reformate storage tank above a reformate threshold. If the reformate amount is above the reformate threshold, then routine 500 continues to 516; if not then routine 500 continues to 512.

At 512, method 500 includes determining if a rate of reformate production is above a production threshold. The rate and production threshold may be measured in mass per unit time, pressure per unit time or volume per unit time. Further, a rate of production may be inferred from a reformate catalyst temperature, a surface area of the catalyst and an amount of fuel in contact with the catalyst. Inclusion of 512 is one example of how a method may increase the supply of reformate to the cylinder of the engine in response to surge and a rate of reformate production at the catalyst above a production threshold. If reformate production rate is above a production threshold, then routine 500 continues to 516; if not, then routine 500 continues to 514.

At 514, the routine 500 includes flagging the increase in percentage of reformate entering one or more example engine cylinders as not feasible. In one example of routine 500, 514 includes setting a variable equal to false (e.g., incrs %=0). In the present example, after 514, the routine ends, however, in additional examples routine 500 includes adjusting at least one of EGR, VCT, lean burn and spark retard (e.g., as at 420 described above with respect to FIG. 4).

In the present example, if reformate amount is above the reformate threshold at 510 and the rate of reformate production is above the production threshold, then routine 500 may continue to 516. At 516, routine 500 includes determining if an air to fuel ratio is above an A/F threshold. Inclusion of 516 in routine 500 is one example of determining if the example engine is running in a lean burn mode. Further 516 may include determining if enriching an air and fuel mixture entering an engine cylinder will improve engine combustion and mitigate surge (e.g., if air to fuel is above the A/F threshold) or lead to further surge (e.g., if air to fuel is below the A/F threshold). If the air to fuel ratio is above the A/F threshold, then routine 500 continues to 518; if not, then routine 500 continues to 514, discussed above.

At 518, routine 500 includes flagging the increase in percentage of reformate entering one or more example engine cylinders as feasible. In one example of routine 500, 518 includes setting a variable equal to true (e.g., incrs %=1). In the present example, after 518, the routine ends. In additional examples, routine 500 includes increasing the percentage of reformate entering the example cylinder(s) of the engine (e.g., as at 418 described above with respect to FIG. 4).

As discussed above, routine 500 is one example of a sub-routine for determining the feasibility of increasing reformate charge concentration. One advantage of routine 500 is that an amount of reformate may be maintained above the example reformate threshold, thereby ensuring an amount of reformate is available to be combusted in the engine later, for example in response to knock. Another advantage of routine 500 is that intake air is not enriched to saturation which may increase hydrocarbon emissions and lowering fuel economy. Further examples of routine 500 include additional processes and determinations and may be arranged differently, (for example, determining if reformate amount is above the reformate threshold (presently at 510) after determining if the rate of reformate production is above the production threshold (presently at 512).

Figure 6:
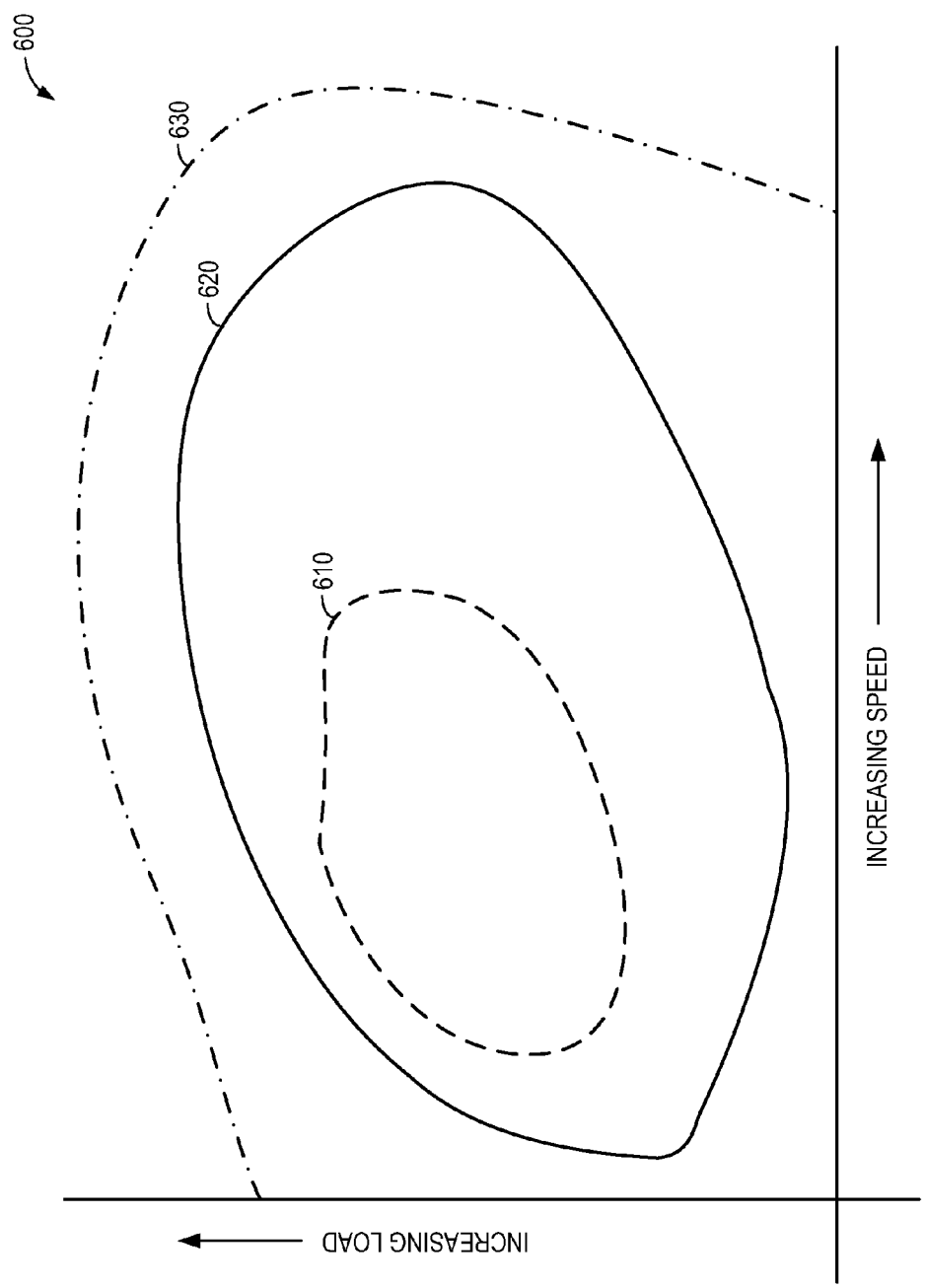
FIG. 6 illustrates an engine map with respect to engine speed-load.

Turning now to FIG. 6, a map 600 illustrating engine operating conditions with respect to engine speed-load is shown. In the present example, three engine conditions 610, 620, and 630 are shown. The boundary of each condition (e.g., solid line boundary of second engine condition 620) includes all of the points on the boundary and within the boundary, including additional engine conditions (e.g., first engine condition 610). In additional examples, engine operating conditions may be exclusive to other operating conditions, and not contain the same engine speed-loads as the other operating conditions.

The boundary of first condition 610 is illustrated by a dashed line. First condition 610 includes intermediate engine loads, and low to intermediate engine speeds. First condition 610 may be above a first example s−1 threshold and below a second s−1 threshold, the second threshold having a greater speed and/or load than the first. Furthermore, in the present example first condition 610 includes engine speeds and loads during which charge dilution via EGR, VVT, boost, etc. may be used. Therefore, an engine operating in first condition 610 which experiences surge may decrease charge dilution and effectively increase charge combustion quality.

An engine operating in the first condition may prioritize engine surge mitigation by first increasing reformate, then decreasing charge dilution and finally adjusting spark timing.

The boundary of second condition 620 is illustrated by a solid line. In one example, second condition 620 includes an entirety of stable engine operating speeds and loads. Second condition 620 may be below the first example s−1 threshold and above the second s−1 threshold. Second condition 620 may be above a third example s−1 threshold and below a fourth s−1 threshold, the fourth threshold having a greater speed and/or load than the third. Furthermore, in the present example second condition 620 includes engine speeds and loads during which charge dilution may, or may not, be used. Further still, such speeds and loads may not facilitate the adjustment of charge dilution without decreasing combustion stability or drive feel.

An engine operating in the second condition may prioritize engine surge mitigation by first increasing reformate, then adjusting spark timing.

The boundary of third condition 630 is illustrated by a dash-dot line. In further examples, the boundary of third condition 630 may depart radically from the present example. Third condition 630 may be below the first example s−1 threshold and above the second s−1 threshold. Furthermore, third condition 630 may be below the third example s−1 threshold and above the fourth s−1 threshold. In the present example at least one of a reformate amount is above an example reformate threshold and a rate of reformate production is above an example production threshold. Adjusting reformate amount provided to an example engine in the third condition allows for mitigation, prevention, or limiting of engine surge across a wide range of engine loads and speeds. Further, adjusting reformate amount may enable a continued use of aggressive charge dilution and spark timing, thereby increasing engine performance and efficiency.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine of a vehicle, comprising:
   reforming ethanol fuel at a catalyst into reformate; and
   adjusting a supply of reformate to a cylinder of the engine in response to an engine surge, the surge including an oscillation in torque produced by the engine; and
   adjusting a vehicle wheel brake based on an accelerometer sensing the oscillation in torque.

2. The method of claim 1, further comprising increasing the supply of reformate to the cylinder of the engine in response to surge.

3. The method of claim 1, further comprising:
   band pass filtering torque oscillation frequencies above and below a surge window, where the engine surge includes engine torque oscillations having frequencies in the surge window.

4. The method of claim 1, further comprising increasing the supply of reformate to the cylinder of the engine in response to surge and a reformate amount in a reformate storage tank above a reformate threshold.

5. The method of claim 1, further comprising increasing the supply of reformate to the cylinder of the engine in response to surge and a rate of reformate production at the catalyst above a production threshold.

6. The method of claim 1, further comprising:
   reducing in the cylinder of the engine at least one of charge dilution level and spark retard in response to surge; and
   increasing the supply of reformate to the cylinder of the engine.

7. The method of claim 1, further comprising adjusting spark timing of a cylinder spark plug in response to surge.

* * * * *